(12) United States Patent
Troan et al.

(10) Patent No.: US 7,711,852 B1
(45) Date of Patent: May 4, 2010

(54) ARRANGEMENT IN A ROUTER FOR INSERTING ADDRESS PREFIXES BASED ON COMMAND LINE ADDRESS IDENTIFIERS

(75) Inventors: Ole Troan, Redhill (GB); Patrick Grossetete, Marcoussis (FR)

(73) Assignee: Cisco Technology, Inc., San Jose, CA (US)

( * ) Notice: Subject to any disclaimer, the term of this patent is extended or adjusted under 35 U.S.C. 154(b) by 1916 days.

(21) Appl. No.: 10/699,889

(22) Filed: Nov. 4, 2003

(51) Int. Cl.
G06F 15/173 (2006.01)
G06F 15/16 (2006.01)

(52) U.S. Cl. .................... 709/242; 709/223; 709/227

(58) Field of Classification Search ............... 709/242, 709/225, 223, 227
See application file for complete search history.

(56) References Cited

U.S. PATENT DOCUMENTS

| 7,328,266 | B2 * | 2/2008 | Schmidt et al. | 709/227 |
| 2003/0126252 | A1 * | 7/2003 | Abir | 709/223 |
| 2004/0078485 | A1 * | 4/2004 | Narayanan | 709/242 |
| 2004/0088544 | A1 * | 5/2004 | Tariq et al. | 713/162 |
| 2005/0021752 | A1 * | 1/2005 | Marimuthu et al. | 709/225 |

OTHER PUBLICATIONS

M. Crawford, Router Renumbering for IPv6, Aug. 2000, RFC 2894.*

O. Troan and R. Droms, IPv6 Prefix Options for DHCPv6, Jun. 6, 2003, IETF.*
Hinden et al., "Internet Protocol Version 6 (IPv6) Addressing Architecture", Request for Comments 3513, Network Working Group, Apr. 2003.
Narten et al., "Privacy Extensions for Stateless Address Autoconfiguration in IPv6", Request for Comments 3041, Network Working Group, Jan. 2001.
Crawford, Router Renumbering for IPv6, Request for Comments 2894, Network Working Group, Aug. 2000.
Troan et al., "IPv6 Prefix Options for DHCPv6", Internet Draft, Network Working Group, draft-ietf-dhc-dhcpv6-opt-prefix-delegation-04.txt, Jun. 6, 2003.

* cited by examiner

Primary Examiner—George C Neurauter, Jr.
Assistant Examiner—Anish Sikri
(74) Attorney, Agent, or Firm—Leon R. Turkevich (57) ABSTRACT

A router is configured for dynamically applying an address prefix value, during execution of a router command, based on retrieving the address prefix value for an address prefix identifier specified in the router command. For example, the router may generate au IP address, for use in executing a router command, based on detecting an address prefix identifier specified in the router command, retrieving a prefix value for the address prefix identifier, and adding the prefix value to an address suffix specified in the router command. Hence, the address prefix identifier in the router command enables global reconfiguration and renumbering of all commands specifying the address prefix identifier, merely by changing the prefix value associated with the address prefix identifier.

28 Claims, 6 Drawing Sheets

ARRANGEMENT IN A ROUTER FOR INSERTING ADDRESS PREFIXES BASED ON COMMAND LINE ADDRESS IDENTIFIERS

BACKGROUND OF THE INVENTION

1. Field of the Invention

The present invention relates to managing router configurations in an Internet Protocol (IP) router. More particularly, the present invention relates to configuration and management of router parameters relying on network address prefixes as router parameters.

2. Description of the Related Art

Routers are processor-based devices configured for routing Network Layer level (i.e., Layer 3) packets between interfaces attached to the router. An example of a Network Layer level packet is an Internet Protocol (IP) packet. A "link" is a physical medium used to connect the interfaces. Each link needs to be numbered using a globally unique identifier, referred to as a network prefix.

The network prefix is used by the routers to identify how a packet having an IP address should be routed. In particular, each IP address (e.g., IPv4, IPv6) is composed of a network portion (i.e., the network prefix) and a host portion (i.e., a host identifier). In the case of an IPv6 address, the total address size is 128 bits and the host identifier is set at 64 bits, leaving 64 bits for the network prefix.

IP address space is hierarchically allocated: a primary authority, known as the Internet Assigned Numbers Authority (IANA), allocates a large block of addresses (e.g., a 16-bit prefix) to a Regional Internet Registry (RIR); the RIR allocates a smaller block of addresses (e.g., a 32-bit prefix) to a local registry such as an Internet Service Provider (ISP). The ISP then allocates a smaller portion of the available address space (preferably a 48-bit prefix) to its subscriber. Address prefixes use slash notation, i.e. a prefix is described as <address>/<prefix length>. Prefix length is the number of significant bits in the address counting from the left, using the address notation specified by the IETF Request for Comments (RFC) 3513, incorporated in its entirety herein by reference.

As an example, the prefixes P1, P2, and P3 can be illustrated as "AAAA:BBBB:/32", "AAAA:BBBB:CCCC::/48" and "AAAA:BBBB:CCCC:DDDD::/64", respectively, where the prefix P1 is a 32-bit prefix assigned by the RIR to an ISP, the prefix P2 is a 48-bit prefix assigned by the ISP to a subscriber, and the prefix P3 is a 64-bit prefix used by the subscriber to identify a subnetwork on a prescribed link. Hence, in this example the subscriber can number 65536 links using the last sixteen (16) bits of the assigned 48-bit prefix.

Figure 1:
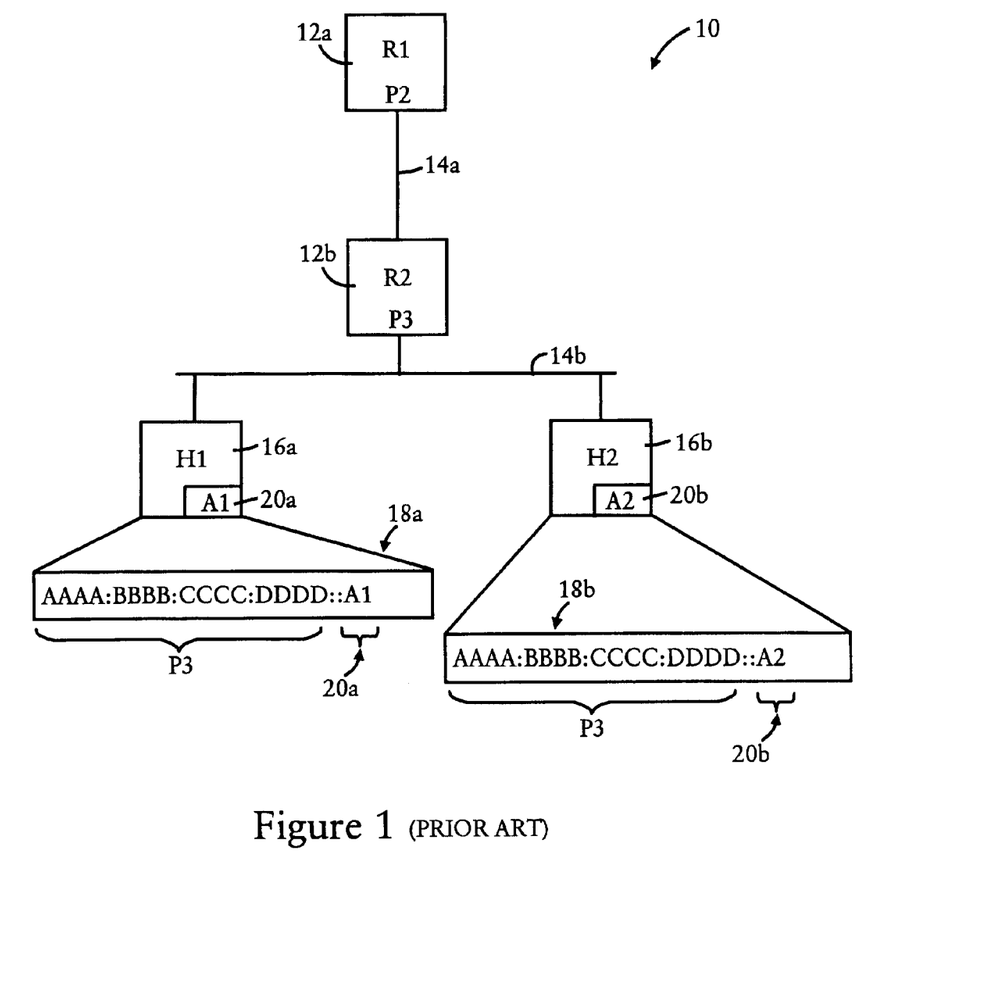
FIG. 1 is a diagram illustrating a conventional (prior art) network architecture where an ISP assigns an address prefix to a router for a subscriber subnetwork.

FIG. 1 is a diagram illustrating a network 10 having routers 12a and 12b, links 14a and 14b, and host computers 16a and 16b. The router 12a is an ISP router and is configured (by an ISP administrator) to recognize that the prefix P2 is reachable via the router 12b. The router 12b, configured by another administrator for the subscriber, advertises the network address prefix P3 to the subnetwork on the link 14b using router advertisement messages, enabling the host computers 16a and 16b to automatically configure their own respective IP addresses 18a and 18b using the network address prefix P3 and their respective local host identifiers 20a and 20b. Hence, the host computers 16a and 16b can automatically manage themselves with respect to IP address assignment.

However, the routers 12a and 12b are unable to manage their respective address assignments. In particular, the routers 12a and 12b need to be manually configured: such manual configuration is needed to identify the range of IP addresses for a given router, and to enable the routers 12a and 12b to identify the links 14a and 14b according to the prefixes P2 and P3, respectively. Routers 12a and 12b typically are managed by manual configuration using a management application that includes, for example, a web interface, an Simple Network Management Protocol (SNMP) management application, a Command Line Interface (CLI), or the like.

This reliance on manual configuration of routers creates substantial problems in deployment of IPv6 services. In particular, the IPv6 architecture includes stateless address autoconfiguration and a mechanism for the advertisement of network address prefixes to automate the renumbing of hosts. However, routers and other network elements require additional configuration changes in response to network renumbering. For example, network addresses appear throughout network element configuration files such as access lists, routing information and host virtualization in content networking products.

Figure 2A:
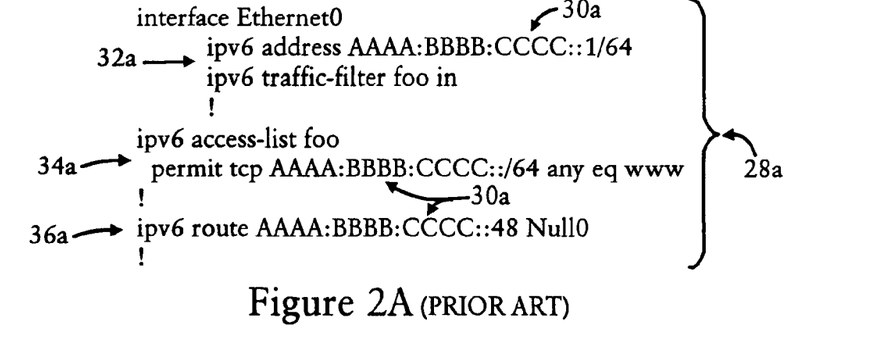
FIGS. 2A, 2B, and 2C are diagrams summarizing prior art methods of performing address renumbering in a router.
Figure 2B:
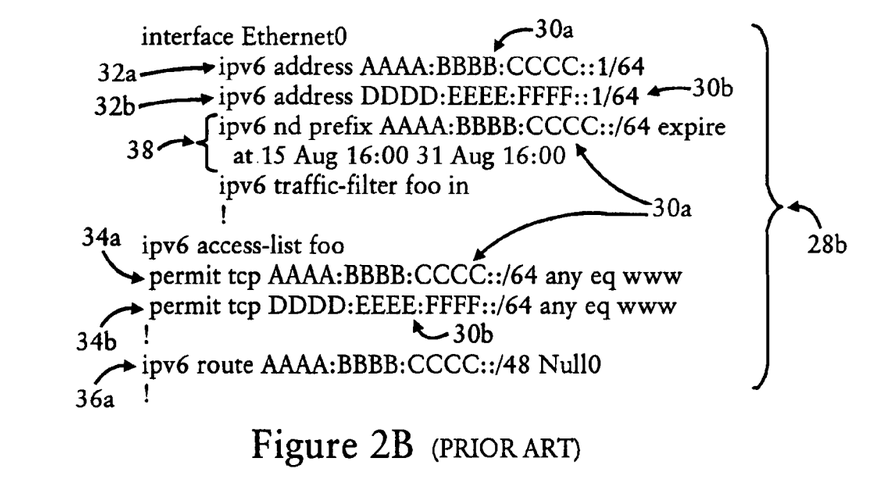
Figure 2C:
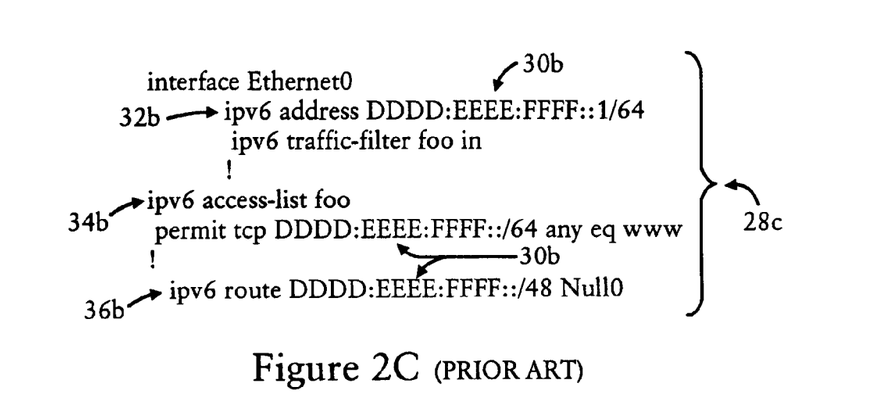

FIGS. 2A, 2B and 2C are diagrams illustrating conventional efforts in performing network renumbering in a router configuration 28a, 28b, and 28c, respectively. Assume that a network needs to be renumbered from an old network prefix (e.g., "AAAA:BBBB:CCCC::/48") to a new network prefix (e.g., "DDDD:EEEE:FFFF::/48"): the renumbering process typically will encounter the additional complication that both the old network prefix and the new network prefix may need to coexist for a period of time while the transition is completed. As illustrated in FIG. 2A, the router configuration 28a includes the old network prefix 30a "hard coded" (i.e., stored as a static value) in an address table entry 32a, an access list entry 34a, and a static route configuration entry 36a. Note that the address table entry 32a includes the old network prefix 30a appended with a sixteen-bit subnet identifier having a value "0001", resulting in the 64-bit prefix "AAAA:BBBB:CCCC:1::/64"; the access list 34a includes the old network prefix 30a appended with a sixteen-bit subnet identifier having a zero value, resulting in the 64-bit prefix "AAAA:BBBB:CCCC::/64".

In order to implement the renumbering of the subnetwork to the new prefix "DDDD:EEEE:FFFF::/48" 30b, the router configuration 28a must be modified as illustrated in FIG. 2B by adding the address table entries 32b, modified entries 38, and the access list entry 34b, resulting in the configuration 28b. As shown in FIG. 2B, the address table entries 32b include the new prefix 30b, and the address table also includes modified entries 38 that specify an expiration time for the old prefix 30a. Following the expiration of the expiration time, the router can be reconfigured to have a router configuration 28c as shown in FIG. 2C, by removing the address table entry 32a, the modified entries 38, the access list entry 34a, and replacing/modifying the static route configuration entry 36a with a new static route configuration entry 36b that specifies the new network prefix 30b.

Hence, substantial manual reconfiguration is required to transition from the router configuration 28a using the old network prefix 30a to the router configuration 28c using the new network prefix 30b.

Another problem is encountered whenever an ISP needs to provide network prefix information to a user. In particular, an ISP typically needs to manage millions of subscribers, each requiring a static network prefix; hence, the ISP needs to either preconfigure the subscriber's router, or send via mail a document to the subscriber with the network prefix information to enable the subscriber to manually configure his router. Hence, this manual configuration by a subscriber is error-prone.

SUMMARY OF THE INVENTION

There is a need for an arrangement that enables an Internet Protocol (IP) router to be dynamically configured with network prefixes, without the necessity of manual configuration.

There also is a need for an arrangement that enables network routers in a wide area network to be reconfigured automatically to optimize deployment of network renumbering within the wide area network.

These and other needs are attained by the present invention, where a router is configured for dynamically applying an address prefix value, during execution of a router command, based on retrieving the address prefix value for an address prefix identifier specified in the router command. For example, the router may generate an IP address, for use in executing a router command, based on detecting an address prefix identifier specified in the router command, retrieving a prefix value for the address prefix identifier, and adding the prefix value to an address suffix specified in the router command. Hence, the address prefix identifier in the router command enables global reconfiguration and renumbering of all commands specifying the address prefix identifier, merely by changing the prefix value associated with the address prefix identifier.

One aspect of the present invention includes a method in an Internet Protocol (IP) based router. The method includes parsing a router command that specifies an address prefix identifier, retrieving an address prefix value for the address prefix identifier, and executing the router command. The router command is executed based on applying the address prefix value as an operand in the router command.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

Figure 3:
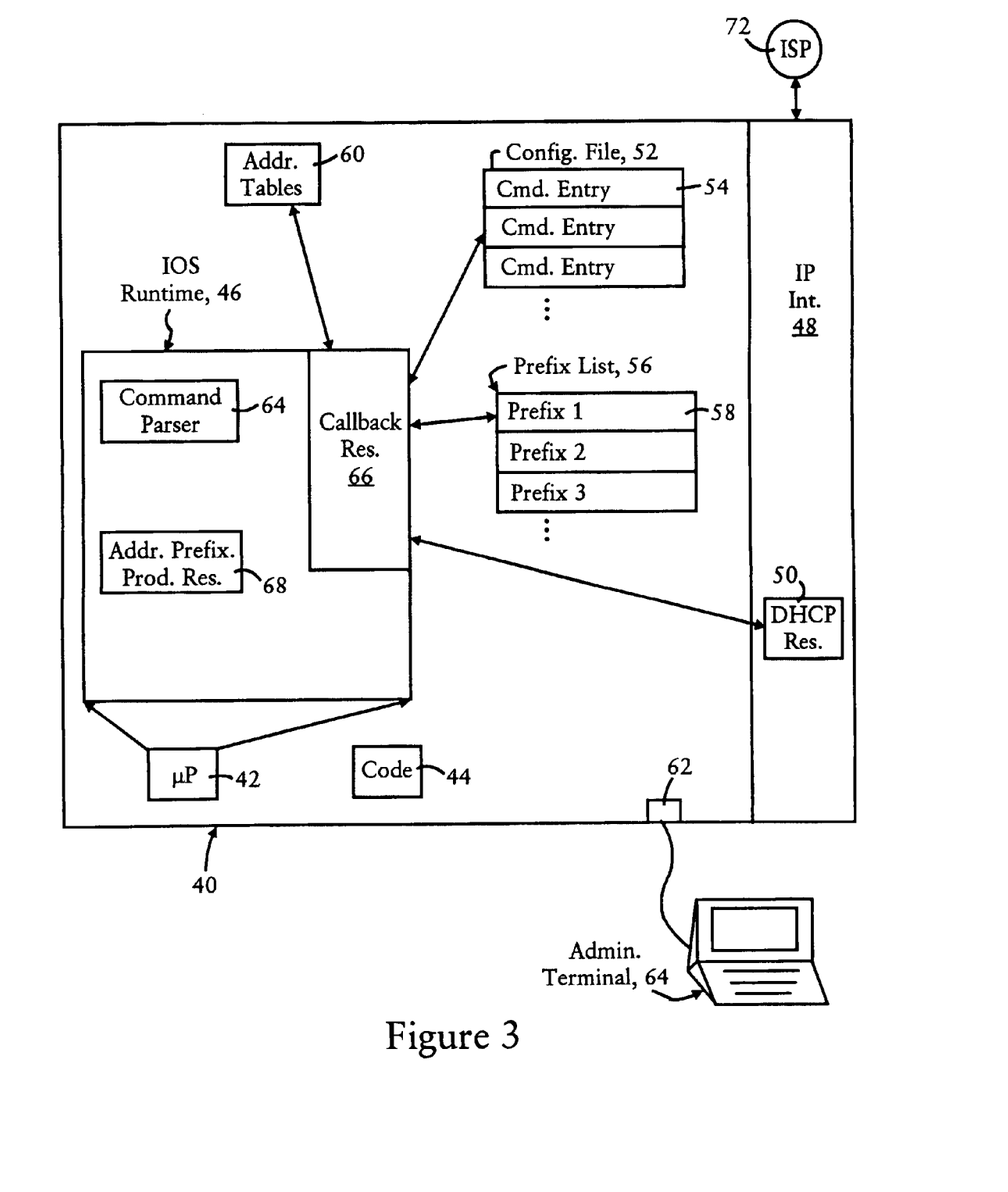
FIG. 3 is a diagram illustrating a router configured for executing a router command, having an address prefix identifier, according to an embodiment of the present invention.

FIG. 3 is a diagram illustrating a router 40 configured for dynamically generating address prefixes based on applying address prefix values to respective address prefix identifiers, according to an embodiment of the present invention. The router 40 includes a microprocessor 42 configured for executing executable code 44 in order to generate in memory an executable runtime environment 46. The executable code 44, for example the commercially available Cisco IOS® Software from Cisco Systems, San Jose, Calif., includes instructions which, when executed by the processor 42, generate an operating system environment 46 for router operations, including routing packets according to IPv4 and/or IPv6 protocol, responding to neighbor discovery requests, etc.

The router 40 also includes an IP interface 48 that includes prescribed IP-based resources 50 (e.g., a Dynamic Host Configuration Protocol (DHCP) resource), a routing configuration file 52 having router command entries 54, a prefix list 56 specifying prefix entries 58, and an address routing table 60. The router 40 also includes a local configuration interface 62 enabling an administrator to configure the router 40 via a local terminal 64, for example using the Command Line Interface (CLI) in the Cisco IOS®-based executable runtime environment 46. As illustrated in FIG. 3, the executable runtime environment 46 also includes a command parser 64, a callback resource 66, and an address prefix producer resource 68.

The routing configuration file 52 is configured for storing router commands 54, also referred to as router command entries, illustrated below with respect to FIGS. 4A-4C and 5A-5B. As described below, at least one router command 54 specifies an address prefix identifier 70 or 82. In particular, the address prefix identifier 70 or 82 provides a generic representation of a logical (i.e., network-based) address prefix, such as an address prefix assigned by an authoritative source such as an Internet Service Provider (ISP) 72.

Figure 4A:
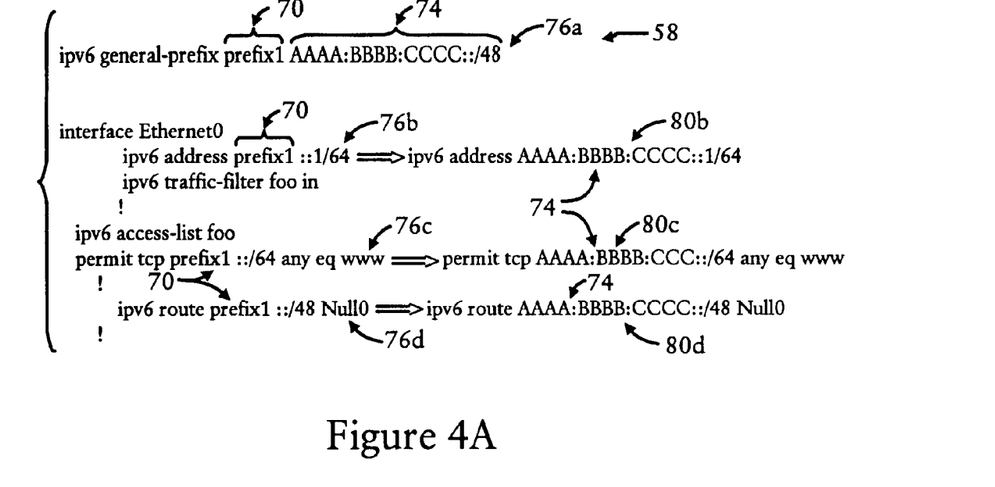
FIGS. 4A, 4B and 4C are diagrams illustrating router commands having an address prefix identifier, and retrieval of associated address prefix values, for execution of the router commands by the router of FIG. 3 according to an embodiment of the present invention.
Figure 4B:
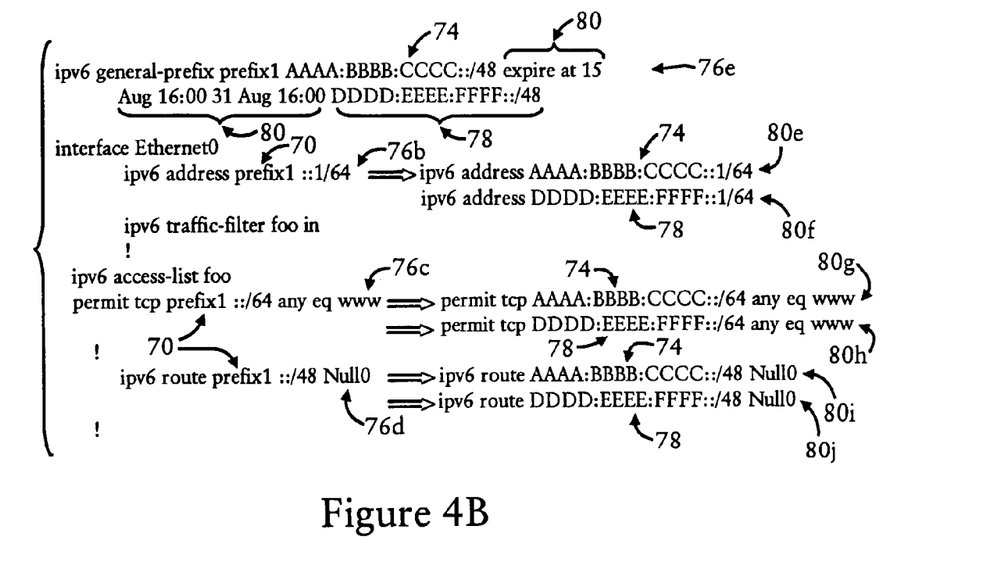
Figure 4C:
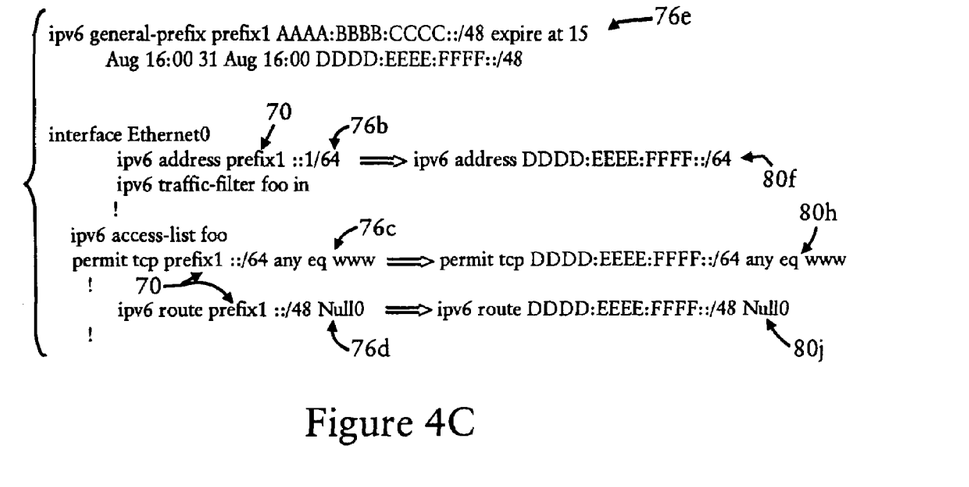

FIGS. 4A, 4B, and 4C are diagrams illustrating the entries for the configuration file 52 and the prefix list 56 for generating address prefixes, according to an embodiment of the present invention. The features of FIGS. 4 and 5 are illustrated in the form of Cisco IOS® command line interface (CLI) entries 76, as would be input by a user via the admin terminal 64, which when executed by the processor 42 would be stored in the appropriate configuration file 52 or prefix list 56.

Figure 5A:
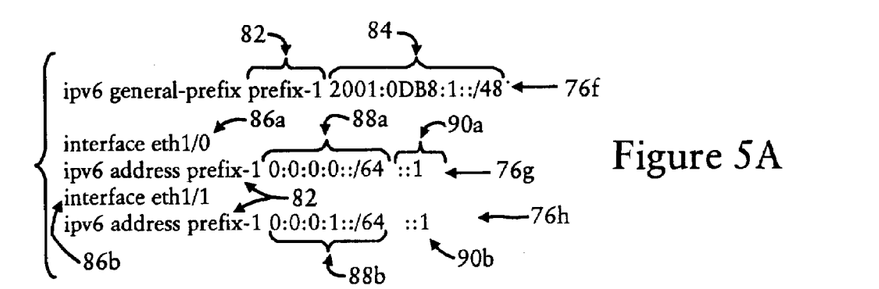
FIGS. 5A and 5B are diagrams illustrating techniques for generation of an IP address by the router of FIG. 3, according to an embodiment of the present invention.
Figure 5B:
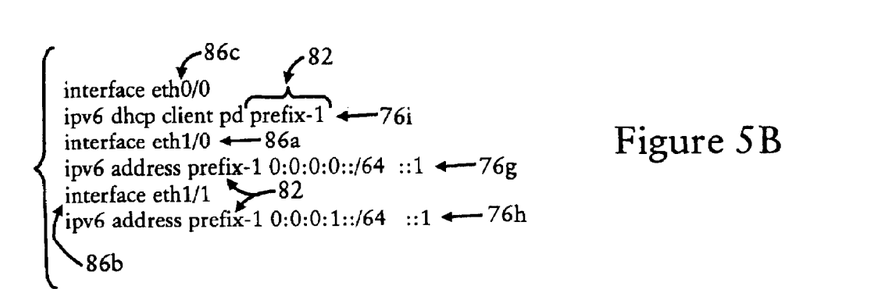

Each prefix entry 58 of the prefix list 56 is assigned by the processor 42 to a corresponding address prefix identifier 70 or 82, illustrated in FIGS. 4 and 5. As illustrated in FIG. 4A, each prefix entry 58 is configured for storing for the corresponding address prefix identifier 70 at least one address prefix value 74 (e.g., "AAAA:BBBB:CCCC::/48") that specifies a prefix value (e.g., "AAAA:BBBB:CCCC::") and a length (e.g., "/48" specifying 48 bits).

Hence, the address prefix identifier 70 provides a nonnumeric representation of an address prefix within the network topology within which the router 40 is deployed. Consequently, the actual address prefix value can be changed in the prefix entry 58, as necessary, without any modification to the configuration file 54 or the executable code 44.

As illustrated in FIG. 4A, the CLI entry 76a is configured as a declaration for specifying that the address prefix identifier 70 is assigned the address prefix value 74: the processor 42 executes the CLI entry 76a by inserting the address prefix value 74 into the memory location 58 assigned for the corresponding prefix 70. As illustrated in FIG. 4B, the CLI entry 76e specifies that the address prefix identifier 70 also can be assigned a new address prefix value 78 in addition to the original address prefix value 74: the CLI entry 76e also specifies an expiration event ("15 August 16:00 31 August 16:00") 80, indicating that the use of the original address prefix value 74 should expire at the earliest at August 15, 16:00 (4 PM), and at the latest at August 31, 16:00 (4 PM) of the current year, based on the local processor clock.

Hence, in the case of FIG. 4A, the callback resource 66 of FIG. 3 fetches the CLI entry 76b from the configuration file 52; in response to the command parser 64 parsing the router command specified in the CLI entry 76b and detecting the address prefix identifier 70, the callback resource 66 retrieves from the prefix entry 58 for the corresponding prefix 70 the address prefix value 74. The address producer resource 68 then applies the retrieved address prefix value 74 as an operand for the address prefix identifier 70 to generate an executable command 80b that includes the valid address prefix value 74. In a similar manner, the executable runtime environment 46 (which includes the command parser 64, the callback resource 66, and the address prefix producer resources 68) generates the executable commands 80c and 80d, each including the valid address prefix value 74, based on retrieving the address prefix 74 for the address prefix identifier 70 specified in each of the respective router commands 76c and 76d.

As illustrated in FIG. 4B, the executable runtime environment 46 may concurrently generate for execution an executable router command 80e and 80f for each of the address prefix value 74 and the new address prefix value 78 based on the execution of the router command 76b being performed before the specified expiration event 80; hence, both executable router commands 80e and 80f may be executed by the processor 42, during execution of the router command 76b, to provide routing operations during intervals in which both prefixes 74 and 78 are valid on the network. Similarly, execution of the router commands 76c and 76d before expiration of the specified expiration event 80 causes the executable runtime environment 46 to generate and execute the executable router commands 80g and 80i for the address prefix value 74, and the executable router commands 80h and 80j for the new address prefix value 78.

As illustrated in FIG. 4C, execution of the router commands 76b, 76c, and 76d after expiration of the specified expiration event 80 causes the executable runtime environment 46 to not apply the expired address prefix value 74, such that only the valid prefix 78 is applied as an operand (prefix1="DDDD:EEEE:FFFF::/48") to generate the respective executable router commands 80f, 80h and 80j.

FIGS. 5A and 5B are diagrams illustrating router commands used for generation of IP addresses, according to an embodiment of the present invention. FIG. 5A specifies a CLI entry 76f, which specifies that the address prefix ("prefix-1") 82 is assigned an address prefix value ("2001:0DB8:1::/48") 84. The command parser 64, in response to detecting the command declaration ("ipv6 general-prefix") 86 that specifies an address prefix identifier, inserts the address prefix value 84 into a memory location 58 assigned to the address prefix identifier 82.

The router command 76g specifies that a router interface 86a ("eth1/0") is to be assigned an IP address based on combining the address prefix identifier 82 with an address prefix mask ("0:0:0:0::/64") 88a using a binary OR operation, and appending the resulting 64-bit prefix with a 64-bit address suffix 90a (e.g., the EUI-64 (Ethernet) address of the interface 86a). Similarly, the router command 76h specifies that a router interface 86b ("eth1/1") is to be assigned an IP address based on combining the address prefix identifier 82 with an address prefix mask ("0:0:0:1::/64") 88b using a binary OR operation, and appending the resulting 64-bit prefix with a corresponding 64-bit address suffix 90b, in this case "::1".

Hence, the executable runtime environment 46 generates the IP addresses assigned for the interfaces 86a and 86b in FIG. 5A based on retrieving the address prefix value 84 from the memory location corresponding to the address prefix identifier 82, applying the respective address prefix masks 88a and 88b, and appending the respective address suffixes 90a and 90b.

FIG. 5B illustrates that the address prefix value for the address prefix identifier 82 can be retrieved based on generating a request, for example as a DHCP client, requesting the address prefix value from the authoritative source 72. In particular, the router command 76i specifies that the address prefix value for the address prefix identifier 82 is obtained according to DHCP protocol; once the DHCP client resource 50 obtains the address prefix value from the ISP 72, the executable runtime environment 46 locally stores the prefix value in the corresponding memory location 58, and executes the router commands 76g and 76h using the address prefix value obtained according to DHCP protocol. Hence, the interfaces 86a, 86b, and 86c can be assigned IP addresses based on delegation of address prefix values using DHCP. Additional details regarding delegation of address prefix values are disclosed in the Internet Draft by Troan et al., "IPv6 Prefix Options for DHCPv6", Oct. 7, 2003, published by the IETF Network Working Group, available on the World Wide Web at http://www.ietforg/internet-drafts/draft-ietf-dhc-dhcpv6-opt-prefix-delegation-05.txt and the disclosure of which is incorporated in its entirety herein by reference. Also note that DHCP is presented as one exemplary technique for acquiring the network prefix.

Figure 6:
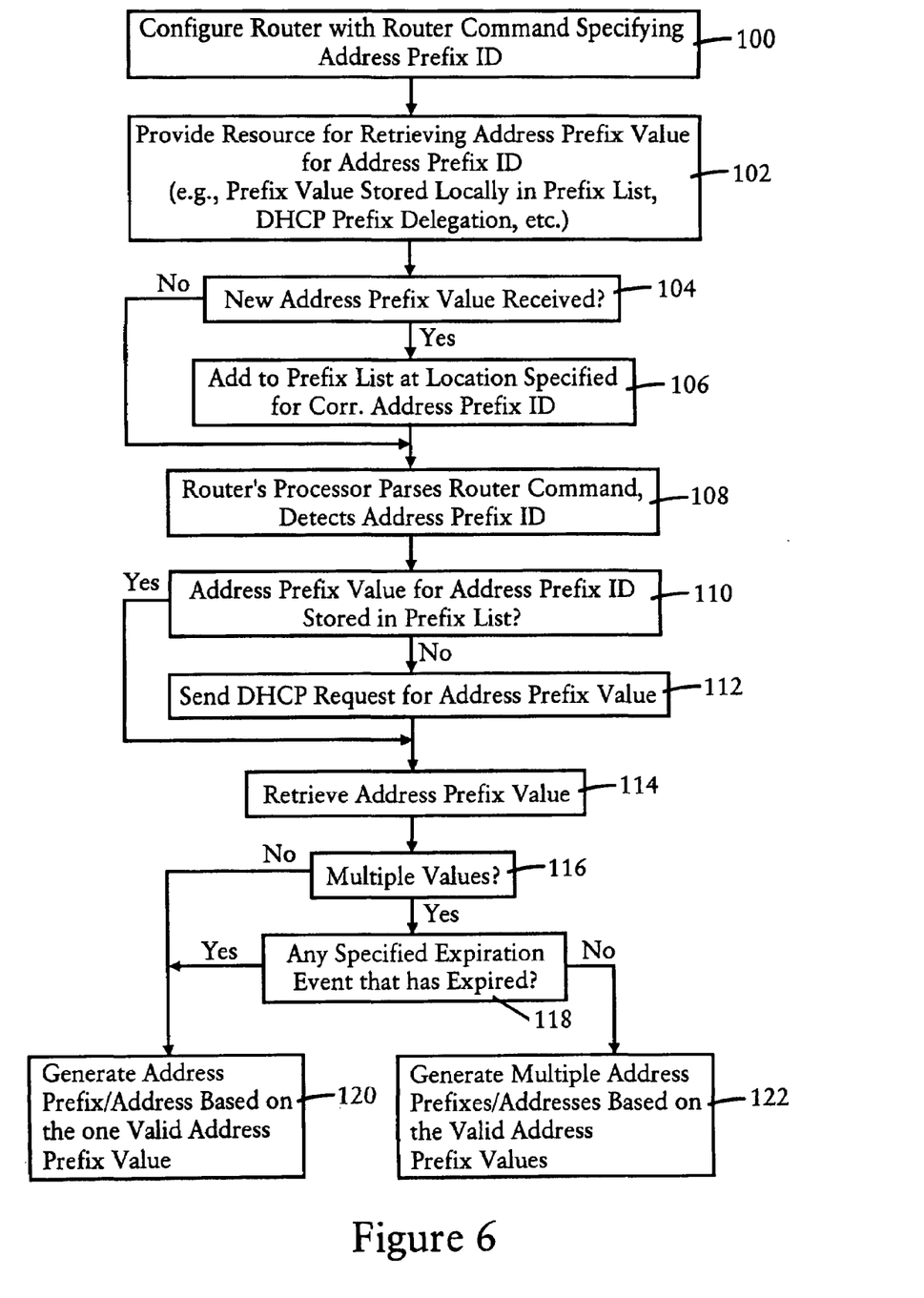
FIG. 6 is a diagram illustrating the method of generating the address prefix for execution of the router command, according to an embodiment of the present invention.

FIG. 6 is a diagram illustrating the method of executing a router command that specifies an address prefix identifier, according to an embodiment of the present invention. The steps described in FIG. 6 can be implemented as executable code stored on a non-transitory computer readable medium (e.g., a hard disk drive, a floppy drive, a random access memory, a read only memory, an EPROM, a compact disk, etc.).

The method begins in step 100, where an administrator configures the router 40, for example by using the admin terminal 64 or by loading executable code 44, to include router commands 76 that specifies address prefix identifiers instead of static address prefixes. During initialization of the executable runtime environment 46, the microprocessor 42 loads in step 102 the callback resource 66 to enable access to the address prefix values based on accessing the prefix list 56, and/or accessing the DHCP resource 50 in the IP interface 48.

The command parser 64 monitors in step 104 for any configuration command or network-based response (e.g., DHCP reply) that specifies a new address prefix value for any address prefix identifier. If a new address prefix value is received, the callback resource 66 adds in step 106 the new address prefix value at the location specified for the corresponding address prefix identifier.

The router processor 42 begins execution of the router commands 76 within the executable runtime environment 46 in step 108, starting with the command parser 64 parsing a router command 76 and detecting a prefix identifier. The command parser 64 passes the detected address prefix identifier to the callback resource 66; if the callback resource 66 determines in step 110 that the address prefix value for the address prefix identifier is not stored in the prefix list 56, the callback resource 66 may send a procedure call for the DHCP client 50. The DHCP client 50 then sends in step 112 a DHCP request to the authoritative source 72.

The callback resource 66 retrieves in step 114 the address prefix value for the specified address prefix identifier, either from the corresponding location 58 in the prefix list 56, or based on receiving a new address prefix value from the ISP 72 according to DHCP protocol. If in step 116 the address prefix producer resource 68 determines the presence of multiple address prefix values for the specified address prefix identifier, as illustrated in the CLI entry 76e in FIGS. 4B and 4C, the address prefix producer resource 68 determines in step 118 if the specified expiration event 80 has expired relative to the internal processor clock. If the expiration event 80 has expired, then the address prefix producer resource 68 generates in step 120 the address prefix and/or address based on the one valid address prefix value, as illustrated in FIG. 4C. If in step 118 the expiration event 80 has not expired relative to the internal processor clock, the address prefix produce resource 68 generates in step 122 multiple address prefixes and/or addresses based on the valid address prefix values, as illustrated in FIG. 4B.

According to the disclosed embodiment, address prefixes can be changed without user intervention, greatly facilitating renumbering operations by eliminating the necessity that network administrators manually reconfigure router settings. Moreover, the new address prefixes can be automatically obtained according to existing prefix delegation protocols, such as DHCP, IPv6 router renumbering according to RFC 2894, etc.

While the disclosed embodiment has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A method comprising:
 executing, by an Internet Protocol (IP) based router, a declaration command stored in a configuration file stored in the router and that specifies an address prefix identifier and at least one of an address prefix value associated with the address prefix identifier or a source for the address prefix value, the address prefix identifier a non-numeric representation of an address prefix required as an operand in at least one stored router command in the configuration file, the executing of the declaration command further including storing in the router the address prefix value into a prescribed storage location that is assigned to the address prefix identifier;
 parsing, by the router, a router command stored within the configuration file of the router and that specifies the address prefix identifier;
 retrieving by the router the address prefix value for the address prefix identifier from the prescribed storage location assigned to the address prefix identifier; and
 executing the router command within the router based on applying the address prefix value retrieved from the prescribed storage location as the operand in the router command.

2. The method of claim 1, wherein the executing of the declaration command further includes:

sending an address prefix request to a prefix delegation requesting client in the router for retrieval of the address prefix value in response to determining the source specifies prefix delegation;
 sending by the prefix delegation requesting client a prefix request according to a prescribed protocol to an authoritative source in response to the address prefix request; and
 receiving, according to the prescribed protocol, the address prefix value for use by the router via an IP link from the authoritative source, the authoritative source authorized to assign the address prefix value to the router.

3. The method of claim 1, further comprising:
 sending an address prefix request to a prefix delegation requesting client in the router for retrieval of the address prefix value in response to a determined absence of the address prefix value in the prescribed location;
 sending by the prefix delegation requesting client a prefix request according to a prescribed protocol to an authoritative source in response to the address prefix request;
 receiving, according to the prescribed protocol, the address prefix value via an IP link from the authoritative source, the authoritative source authorized to assign the address prefix value to the router; and
 storing the address prefix value received via the IP link into the prescribed storage location.

4. The method of claim 1, further comprising:
 receiving a new address prefix value to be applied in executing the address prefix identifier in the router command; and
 updating the prescribed storage location, associated with the address prefix identifier and that specifies the address prefix value, to also include the new address prefix value;
 wherein the executing step includes applying at least one of the address prefix value or the new address prefix value as the operand.

5. The method of claim 4, wherein the receiving step includes detecting a specified expiration event associated with the address prefix value, the executing step including not applying the address prefix value after the corresponding specified expiration event.

6. The method of claim 5, wherein the executing step includes executing the router command for each of the address prefix value and the new address prefix value, based on the executing step being performed before the specified expiration event.

7. The method of claim 1, wherein the executing step includes:
 detecting within the router command an address prefix mask and an address suffix for specifying a router interface; and
 generating an IP address for the router interface based on applying the address prefix mask to the address prefix value and appending the address suffix.

8. An Internet Protocol (IP) based router comprising:
 a routing configuration file configured for storing router commands each specifying an address prefix identifier that is a non-numeric representation of an address prefix required as an operand, the router commands including a declaration command specifying the address prefix identifier and at least one of an address prefix value associated with the address prefix identifier or a source for the address prefix value, the router commands further including a second router command at least one router command specifying the address prefix identifier as an operand for a prescribed operation;

a memory configured for storing at least the address prefix value at a prescribed storage location associated with the address prefix identifier;

a processor configured for associating the prescribed storage location with the address prefix identifier and storing the address prefix value into the prescribed storage location in response to executing the declaration command, the processor further configured for executing the second router command based on retrieving the address prefix value from the prescribed storage location in response to detecting the address prefix identifier and applying the address prefix value as an operand in the second router command; and an interface configured for routing an IP packet according to execution of the second router command.

9. The router of claim 8, wherein:

the interface comprises a prefix delegation requesting client configured for sending a prefix request according to a prescribed protocol to an authoritative source in response to receiving an address prefix request from the processor, the processor configured for sending the address prefix request to the prefix delegation requesting client in response to detecting during execution of the declaration command that the source specifies prefix delegation;

the prefix delegation requesting client configured for receiving the address prefix value via an IP link from the authoritative source according to the prescribed protocol executed by the prefix delegation requesting client, the processor configured for storing the address prefix value obtained by the prefix delegation requesting client into the memory at the prescribed storage location associated with the address prefix identifier.

10. The router of claim 9, wherein the processor further is configured for generating a request to the prefix delegation requesting client to generate a second request from the authoritative source for the address prefix value based on a determined absence of the address prefix value in the prescribed storage location.

11. The router of claim 9, wherein:

the prefix delegation requesting client is configured for receiving a new address prefix value to be applied in executing the address prefix identifier in the second router command; and the processor is configured for updating the prescribed storage location in the memory, associated with the address prefix identifier and that specifies the address prefix value, to also include the new address prefix value, the processor configured for applying at least one of the address prefix value or the new address prefix value as the operand.

12. The router of claim 11, wherein the processor, in response to detecting a specified expiration event associated with the address prefix value, selectively avoids applying the address prefix value after the corresponding specified expiration event.

13. The router of claim 12, wherein the processor is configured for executing the second router command for each of the address prefix value and the new address prefix value, based on determining that execution thereof is being performed before the specified expiration event.

14. The router of claim 8, wherein the processor, in response to detecting within the second router command an address prefix mask and an address suffix for specifying a router interface, generates an IP address for the router interface based on applying the address prefix mask to the address prefix value and appending the address suffix.

15. A non-transitory computer readable medium having stored thereon sequences of instructions for routing packets by an Internet Protocol (IP) based router, the sequences of instructions including instructions for:

executing, by the router, a declaration command stored in a configuration file stored in the router and that specifies an address prefix identifier and at least one of an address prefix value associated with the address prefix identifier or a source for the address prefix value, the address prefix identifier a non-numeric representation of an address prefix required as an operand in at least one stored router command in the configuration file, the executing of the declaration command further including storing in the router the address prefix value into a prescribed storage location that is assigned to the address prefix identifier;

parsing, by the router, a router command stored within the configuration file of the router and that specifies the address prefix identifier;

retrieving by the router the address prefix value for the address prefix identifier from the prescribed storage location assigned to the address prefix identifier; and executing the router command within the router based on applying the address prefix value retrieved from the prescribed storage location as the operand in the router command.

16. The medium of claim 15, wherein the executing of the declaration command further includes:

sending an address prefix request to a prefix delegation requesting client in the router for retrieval of the address prefix value in response to determining the source specifies prefix delegation;

sending by the prefix delegation requesting client a prefix request according to a prescribed protocol to an authoritative source in response to the address prefix request; and receiving, according to the prescribed protocol, the address prefix value for use by the router via an IP link from the authoritative source, the authoritative source authorized to assign the address prefix value to the router.

17. The medium of claim 15, further comprising:

sending an address prefix request to a prefix delegation requesting client in the router for retrieval of the address prefix value in response to a determined absence of the address prefix value in the prescribed location;

sending by the prefix delegation requesting client a prefix request according to a prescribed protocol to an authoritative source in response to the address prefix request;

receiving, according to the prescribed protocol, the address prefix value via an IP link from the authoritative source, the authoritative source authorized to assign the address prefix value to the router; and storing the address prefix value received via the IP link into the prescribed storage location.

18. The medium of claim 15, further comprising instructions for:

receiving a new address prefix value to be applied in executing the address prefix identifier in the router command; and updating the prescribed storage location, associated with the address prefix identifier and that specifies the address prefix value, to also include the new address prefix value;

wherein the executing step includes applying at least one of the address prefix value or the new address prefix value as the operand.

19. The medium of claim 18, wherein the receiving step includes detecting a specified expiration event associated with the address prefix value, the executing step including not applying the address prefix value after the corresponding specified expiration event.

20. The medium of claim 19, wherein the executing step includes executing the router command for each of the address prefix value and the new address prefix value, based on the executing step being performed before the specified expiration event.

21. The medium of claim 15, wherein the executing step includes:
  detecting within the router command an address prefix mask and an address suffix for specifying a router interface; and
  generating an IP address for the router interface based on applying the address prefix mask to the address prefix value and appending the address suffix.

22. An apparatus comprising:
  means for storing router commands each specifying an address prefix identifier that is a non-numeric representation of an address prefix required as an operand, the router commands including a declaration command specifying the address prefix identifier and at least one of an address prefix value associated with the address prefix identifier or a source for the address prefix value, the router commands further including a second router command specifying the address prefix identifier as an operand for a prescribed operation, the means for storing further configured for storing at least the address prefix value at a prescribed storage location associated with the address prefix identifier; and
  means for associating the prescribed storage location with the address prefix identifier and storing the address prefix value into the prescribed storage location in response to executing the declaration command, the means for associating further configured for executing the second router command based on retrieving the address prefix value from the prescribed storage location in response to detecting the address prefix identifier and applying the address prefix value as an operand in the second router command, the means for associating further configured for routing an IP packet according to execution of the second router command.

23. The apparatus of claim 22, wherein:
  the means for associating includes a prefix delegation requesting client configured for sending a prefix request according to a prescribed protocol to an authoritative source in response to an address prefix request generated by the means for associating, the means for associating generating the address prefix request in response to detecting during execution of the declaration command that the source specifies prefix delegation;
  the prefix delegation requesting client configured for receiving the address prefix value via an IP link from the authoritative source according to the prescribed protocol executed by the prefix delegation requesting client, the means for associating configured for storing the address prefix value obtained by the prefix delegation requesting client into the prescribed storage location associated with the address prefix identifier.

24. The apparatus of claim 23, wherein the means for associating further is configured for generating a request to the prefix delegation requesting client to generate a second request from the authoritative source for the address prefix value based on a determined absence of the address prefix value in the prescribed storage location.

25. The apparatus of claim 23, wherein:
  the prefix delegation requesting client is configured for receiving a new address prefix value to be applied in executing the address prefix identifier in the second router command; and
  the means for associating is configured for updating the prescribed storage location in the memory, associated with the address prefix identifier and that specifies the address prefix value, to also include the new address prefix value, the means for associating configured for applying at least one of the address prefix value or the new address prefix value as the operand.

26. The apparatus of claim 25, wherein the means for associating, in response to detecting a specified expiration event associated with the address prefix value, selectively avoids applying the address prefix value after the corresponding specified expiration event.

27. The apparatus of claim 26, wherein the means for associating is configured for executing the second router command for each of the address prefix value and the new address prefix value, based on determining that execution thereof is being performed before the specified expiration event.

28. The apparatus of claim 22, wherein the means for associating, in response to detecting within the second router command an address prefix mask and an address suffix for specifying a router interface, generates an IP address for the router interface based on applying the address prefix mask to the address prefix value and appending the address suffix.

* * * * *